United States Patent [19]
Ohira et al.

[11] Patent Number: 5,751,690
[45] Date of Patent: May 12, 1998

[54] OPTICAL DISK HAVING PATTERN DISPLAYED THEREON AND APPARATUS FOR MANUFACTURING SAME

[75] Inventors: Hiroyuki Ohira; Nobuki Yamaoka; Yutaka Murakami, all of Yamanashi, Japan

[73] Assignees: Pioneer Video Corporation, Yamanashi; Pioneer Electronic Corporation, Tokyo, both of Japan

[21] Appl. No.: 889,177

[22] Filed: Jul. 7, 1997

Related U.S. Application Data

[63] Continuation-in-part of Ser. No. 560,985, Nov. 20, 1995, abandoned.

[30] Foreign Application Priority Data

Dec. 15, 1994 [JP] Japan .................................... 6-312081

[51] Int. Cl.⁶ .................................................... G06K 19/06
[52] U.S. Cl. .................................................... 369/275.3
[58] Field of Search ........................ 369/275.1, 275.2, 369/275.3, 275.4, 112, 110, 109, 97, 98

[56] References Cited

U.S. PATENT DOCUMENTS

| | | | |
|---|---|---|---|
| 5,285,438 | 2/1994 | Marchand et al. | 369/275.3 |
| 5,347,509 | 9/1994 | Goldberg et al. | 369/275.3 |
| 5,398,231 | 3/1995 | Shin et al. | 369/275.4 |
| 5,608,717 | 3/1997 | Ho et al. | 369/275.1 |
| 5,608,718 | 3/1997 | Schiewe | 369/275.4 |

FOREIGN PATENT DOCUMENTS 5-797   1/1993   Japan .

*Primary Examiner*—Nabil Hindi
*Attorney, Agent, or Firm*—Morgan, Lewis & Bockius LLP

[57] ABSTRACT

An optical disk in which a pattern such as a character that can be recognized is displayed in an information recording area by display pits or grooves formed between recording tracks constructed by pit trains indicative of information signals. An apparatus for manufacturing the optical disk in which information and display modulation light beams obtained by modulating a light beam in accordance with pattern signals for information and display, respectively, are separated from each other in the disk radial direction and are simultaneously irradiated to a resist layer formed on a recording surface of a disk.

10 Claims, 5 Drawing Sheets

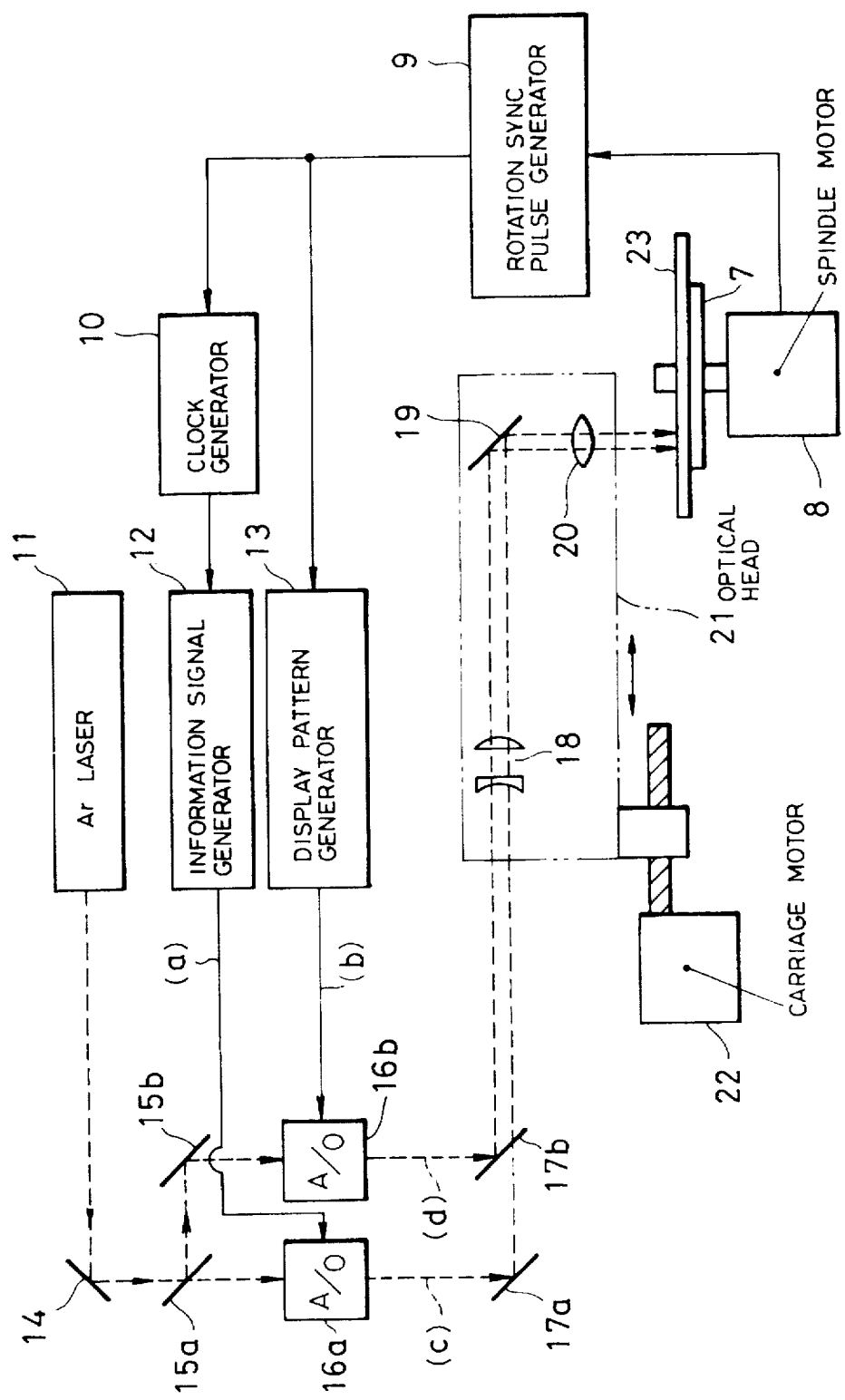

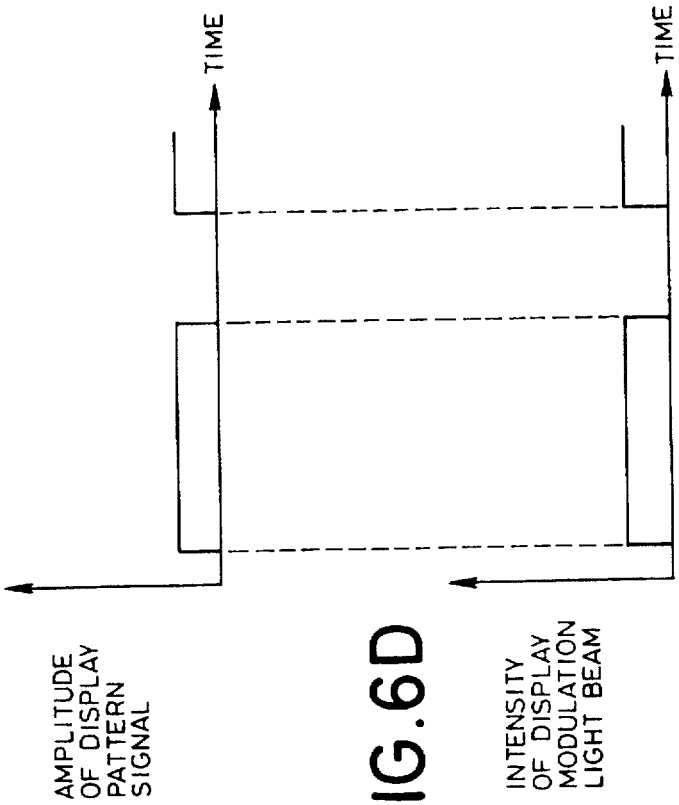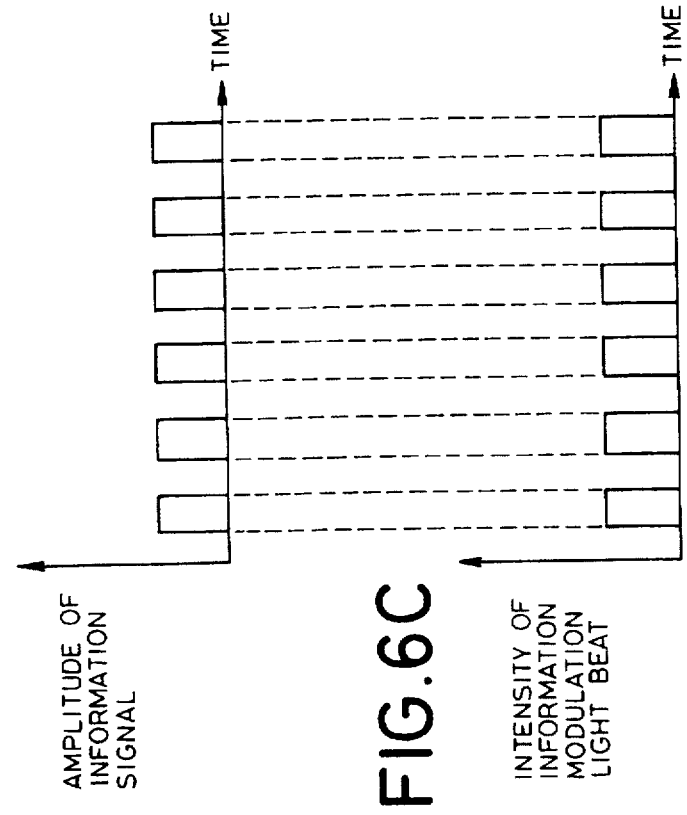
FIG.6A  FIG.6B  FIG.6C  FIG.6D

OPTICAL DISK HAVING PATTERN DISPLAYED THEREON AND APPARATUS FOR MANUFACTURING SAME

This application is a continuation of application Ser. No. 08/560.985. filed Nov. 20, 1995, now abandoned.

BACKGROUND OF THE INVENTION

1. Field of the Invention

The present invention relates to an optical disk and its manufacturing apparatus.

2. Description of the Related Background Art

As a conventional optical disk, as shown in FIG. 1, an optical disk 31 in which a pattern such as a character "A" that can be recognized has been formed in an area 31b between an information recording area 31a and a label area 31c of the optical disk 31 is well-known in, for example, Japanese Patent Publication No. JP-5-797.

Since a display area of such a pattern is narrow, however, an enough large pattern cannot be displayed and its display information amount is also limited.

SUMMARY OF THE INVENTION

The present invention is, therefore, made in consideration of the above problems and it is object of the invention to provide an optical disk which can display a clear and large pattern such as a character and an apparatus for manufacturing the optical disk.

According to the present invention, there is provided an optical disk having an information recording area in which concentrical or spiral recording tracks constructed by pit trains indicative of information signals have been formed, wherein pits or grooves for display are formed between recording tracks so as to indicate a pattern which can be recognized into the information recording area.

In the optical disk according to the present invention, a pattern such as a character which can be recognized by a user is displayed in the information recording area by the pits or grooves for display formed between the recording tracks.

An apparatus for manufacturing an optical disk according to the invention comprises: a turntable for supporting a disk having an unexposed photoresist layer onto a recording surface and for rotating the supported disk; an exposing source for emitting a light beam; rotation sync signal generating means for generating a rotation sync signal synchronized with the rotation of the turntable; information signal generating means for generating an information signal in accordance with the rotation sync signal; display pattern signal generating means for generating a display pattern signal to form a recognizable pattern in accordance with the rotation sync signal; first modulating means for modulating the light beam in accordance with the information signal and for forming a modulation light beam for information; second modulating means for modulating a light beam in accordance with the display pattern signal and for forming a modulation light beam for display; and irradiating means for irradiating the information modulation light beam and the display modulation light beam onto the recording surface so as to be away from each other in the disk radial direction.

In the optical disk manufacturing apparatus according to the invention, the light beam is modulated in accordance with the information display signal and display pattern signal, respectively, the resultant information modulation light beam and display modulation light beam are separated from each other in the disk radial direction, and the separated light beams are simultaneously irradiated onto the resist layer formed on the recording surface of the supported disk, so that the optical disk can be formed in a short time.

BRIEF DESCRIPTION OF THE DRAWINGS

FIG. 5 is a schematic block diagram showing an embodiment of an apparatus for manufacturing the optical disk of the invention; and FIG. 6A to 6D are diagrams showing examples of signal waveforms of respective portions in the apparatus of FIG. 5.

DETAILED DESCRIPTION OF THE PREFERRED EMBODIMENTS

An embodiment of the invention will now be described hereinbelow with reference to the drawings.

Figure 1:
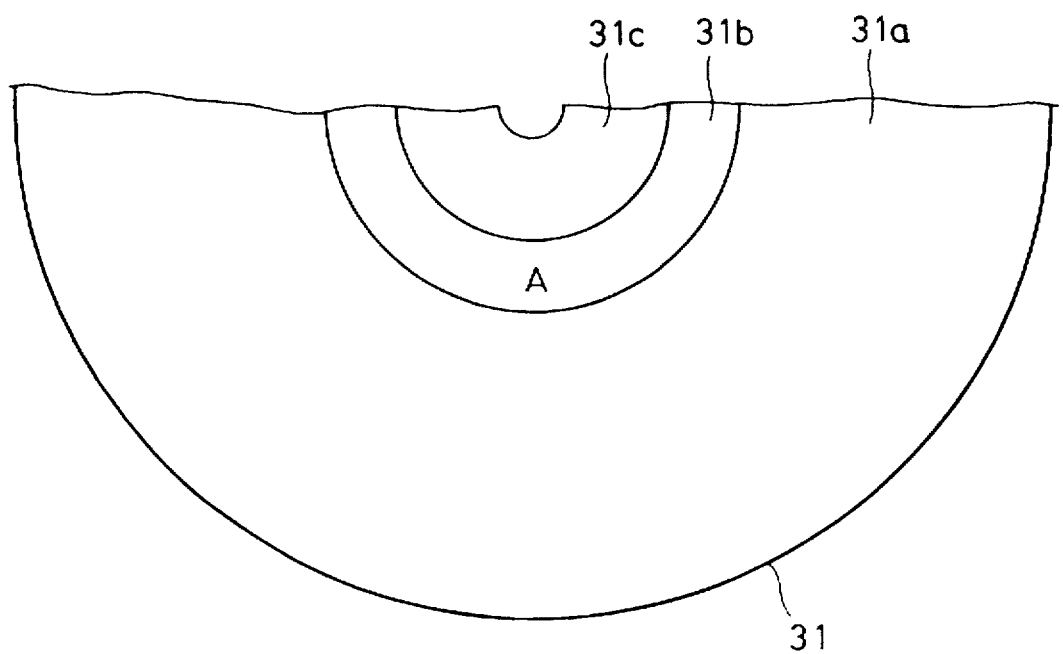
FIG. 1 is a schematic diagram of a conventional optical disk.
Figure 2A:
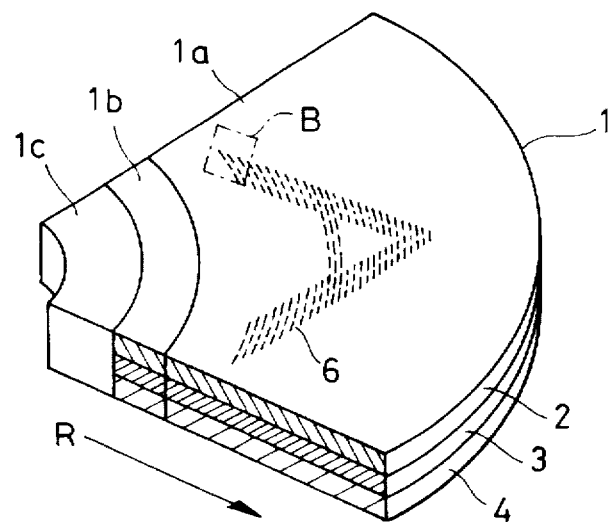
FIG. 2A is a perspective view showing a portion of an optical disk as an embodiment of the optical disk of the invention.
Figure 2B:
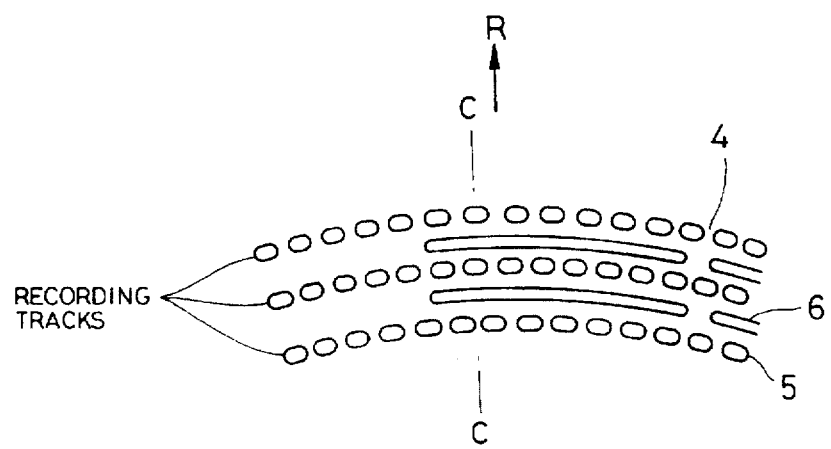
FIG. 2B is an enlarged diagram of a B portion in FIG. 2A.
Figure 2C:
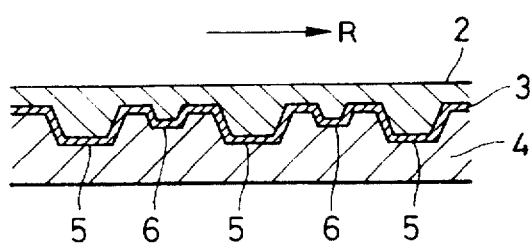
FIG. 2C is a vertical sectional view taken along the line C—C in FIG. 2B.

FIGS. 2A to 2C show a structure of an optical disk according to the invention. The portions similar to those in FIG. 1 are designated by the same reference numerals. As shown in FIGS. 2A and 2C, the optical disk 1 is constructed by a substrate 4, a reflecting layer 3, and a protecting layer 2. Information pits 5 which indicate an information signal and form recording tracks, and display pits 6 for forming recognizable patterns are formed on one side of the substrate 4. The pit forming surface of the substrate 4 is covered by the reflecting layer 3 and the protecting layer 2 is, further, formed on the reflecting layer 3.

FIG. 2A shows a perspective view of a portion of the optical disk of the invention. In the diagram, a character "A" as a recognizable pattern is formed in a portion corresponding to the information recording area 1a on the substrate 4 by a distributing state or a distributing shape of the display pits 6. The information pits (not shown) constructing the recording tracks are also concentrically or spirally formed in the portion of the information recording area 1a on the substrate 4. An arrow R indicates a radial direction.

FIG. 2B shows an enlarged diagram of a B portion in FIG. 2A. In the substrate 4, the display pits 6 are formed between the recording tracks each comprising a train of the information pits 5. A pitch of the recording track is equal to, for example, 1.4 to 2.0 μm and the display pits 6 are located at an intermediate region between the recording tracks. The character "A" is displayed by the distributing state of the display pits 6. Each display pit 6 is formed longer than that of each information pit 5 along the track.

FIG. 2C shows a vertical sectional view taken along the line C—C in FIG. 2B. As shown in the diagram, the display pits 6 are formed between the information pits 5. Both of a width and a depth of each display pit 6 are formed smaller than a width and a depth of each information pit 5.

Figure 3:
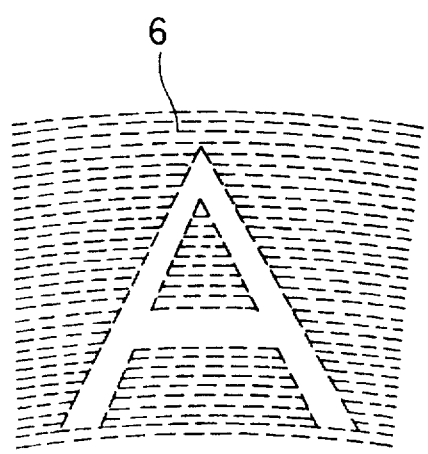
FIG. 3 shows another embodiment of the optical disk of the invention.

In the optical disk shown in FIGS. 2A to 2C, the display pits 6 are formed between the tracks of the information pits 5, and the distributing shape is formed so as to correspond to the pattern of the character "A" which can be recognized by a user. On the other hand, it is also possible to set the pattern portion of the character "A" to a blank portion and to form the display pits in portions around the pattern or a whole portion out of the pattern. In this case, the pattern is displayed as shown in, for example, FIG. 3. Solid lines in FIG. 3 indicate the display pits and the information pits constructing the recording tracks are omitted here.

FIGS. 2A to 2C and 3, although the pits are formed in order to display a recognizable pattern, it is also possible to form grooves between the tracks in place of the pits in order to display a pattern which can be recognized. In the above embodiments, although the character "A" has been shown by the display pits, the invention is not limited to such a character. For example, a pattern such as graphics and photograph indicative of the contents of information signals recorded on the optical disk can be displayed.

A physical shape of such a display pit or groove is determined as follows. Assuming that a frequency of the display pit or groove lies within a range from 20 kHz as an upper limit of a frequency band of a tracking servo to 196 kHz as a lower limit value of an EFM (Eight Fourteen Modulation) audio signal, when the information signal is reproduced or the tracking servo is performed, an interference by the display pits can be prevented. When further considering an influence by harmonics, it is preferable to set the frequency band of the display pits or grooves to 20 to 100 kHz. Although a length of information pit lies within a range from 0.5 to 2.5 µm, therefore, a length of display pit or groove is set to a range from tens to hundreds of µm in correspondence to the frequency band. In consideration of a restriction on manufacturing of the optical disk and an influence by crosstalks, it is preferable that the display pits or grooves are formed in an intermediate region between the recording tracks and the width and depth of display pit or groove are set to values which are equal to or less than about ½ of the information pit (width: 0.4 to 0.6 µm, depth: 1000 to 1500 Å).

In the optical disk of the invention, differences between diffraction angles of the reflected light from the portion in which the display pits or grooves are formed and the reflected light from the other portions are used, thereby making the display pattern. The principle will now be explained hereinbelow.

Figure 4:
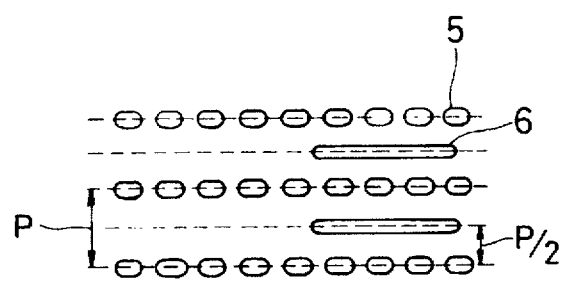
FIG. 4 is a diagram showing a construction of display pits and information pits of the optical disk of the invention.

It is assumed that an incident angle of the incident light to the pit is set to θi and a wavelength of the incident light is set to λ, and a diffraction angle of the reflected light from the pits arranged in the disk radial direction is set to θd. First, when no display pit is formed, it is necessary to satisfy the conditions of the following equation (1) in order to generate a strong diffraction light in the direction of θd1 because the phases of all of the lights diffracted from the respective pits are equal and the diffracted lights become mutually strong. In this case, a lattice constant is set to a recording track pitch P as shown in FIG. 4. n denotes an integer.

Equation (1):

$$P(sin\theta i + sin\theta d1) = n\lambda$$

In order to simplify the above equation (1), when considering a primary diffraction light by assuming that the incident angle θi is equal to 0° and n=1, the equation (1) can be expressed as shown in the following equation (2).

Equation (2):

$$P \cdot sin\theta d1 = \lambda$$

When rearranging the equation (2) with respect to θd1, the following equation (3) is derived.

Equation (3):

$$\theta d1 = sin^{-1}(\lambda/P)$$

If the display pits are formed between the recording tracks, as shown in FIG. 4, the lattice constant is set to P/2 as a pitch between the information pits and the display pits. In order to generate the strong diffraction light in the direction of θd2, therefore, it is necessary to satisfy the following equation (4).

Equation (4):

$$(P/2) \cdot (sin\theta i + sin\theta d2) = n\lambda$$

For simplification, when considering the primary diffraction light by assuming that the incident angle θi=0° and n=1, the equation (4) can be expressed as shown in the following equation (5).

Equation (5):

$$(P/2) \cdot sin\theta d2 = \lambda$$

When rearranging the equation (5) with respect to θd2, the following equation (6) is obtained.

Equation (6):

$$\theta d2 = sin^{-1}(2\lambda/P)$$

As will be obviously understood from the above equations (3) and (6), if the display pits exist, the diffraction angle θd2 is about two times as large as the diffraction angle θd1 in case of no display pit. Since the color on the short wavelength side of the reflected diffraction light in the case where the display pits exist is stronger than that of the reflected diffraction light in case of no display pit, therefore, the pattern by the display pits or grooves can be visually discriminated by the difference of the colors. That is, in the case where the display pits are formed, as compared with the case where no display pit is formed, the pattern is displayed as rainbow colors having strong blue.

An embodiment of a optical disk manufacturing apparatus according to the present invention will now be described with reference to the drawings.

FIG. 5 shows an embodiment of the optical disk manufacturing apparatus according to the invention. The manufacturing apparatus has the following construction.

As a light source for emitting a light beam, an Ar laser 11 is used. An information signal generator 12 is used as information signal generating means for generating an information signal. A display pattern generator 13 is used as display pattern signal generating means for generating a display pattern signal to form a recognizable pattern.

As first and second modulating means, A/O modulators (Acoustic Optical Modulators) 16a and 16b are used.

As irradiating means, a mirror 17a, a beam splitter 17b, a beam expander 18, a mirror 19, and an objective lens 20 are used. An optical head 21 constructed by the beam expander 18, mirror 19, and objective lens 20 is driven in the directions shown by arrows (optical disk radial direction) by a carriage motor 22.

A turntable 7 supports a disk 23 having a positive type photoresist layer, which is exposed to form pits, on its surface. The turntable 7 is rotated by a spindle motor 8.

A rotation sync pulse generator 9 is used as rotation sync signal generating means for generating a rotation sync pulse synchronized with the rotation of the turntable 7. A clock generator 10, further, generates a clock pulse in accordance with the rotation sync pulse.

The optical disk manufacturing apparatus performs the following recording operation.

A light beam generated from the Ar laser 11 is reflected by a mirror 14, enters a beam splitter 15a, and is divided into a transmitted light beam and a reflected light beam. The beam splitter 15a is adjusted so as to equalize light amounts of the transmitted light beam and reflected light beam. The transmitted light beam enters the A/O modulator 16a. The reflected light beam is reflected by the mirror 15b and, after that, enters the A/O modulator 16b.

A rotation sync pulse is generated in synchronism with the rotation of the turntable 7 from the rotation sync pulse generator 9. The clock generator 10 generates a clock pulse in response to the rotation sync pulse. The information signal generator 12 generates, for example, an information signal as shown in FIG. 6A in synchronism with the clock pulse. The A/O modulator 16a modulates the transmitted light beam in accordance with the information signal, thereby generating an information modulation light beam at an intensity as shown in FIG. 6C.

In accordance with the rotation sync signal generated from the rotation sync pulse generator 9, in order to form a recognizable pattern, a display pattern signal as shown in FIG. 6B is generated from the display pattern generator 13. The A/O modulator 16b modulates the reflected light beam in accordance with the display pattern signal, thereby generating a display modulation light beam at an intensity as shown in FIG. 6D. The intensity of display modulation light beam is equal to or less than about ½ of the intensity of information modulation light beam. In place of the A/O modulator, an E/O modulator can be also used.

Assuming that an amplitude of display pattern signal is set to a value that equal to or less than about ½ of an amplitude of information signal, a depth and a width of display pits formed in the photoresist layer are set to values which are equal to or less than about ½ of those of information pit. The lengths of the respective pits are adjusted by pulse widths of the display pattern signal and information signal.

The information modulation light beam is subsequently irradiated to the photoresist layer of the disk 23 through the mirror 17a, beam splitter 17b, beam expander 18, mirror 19, and objective lens 20, thereby recording the information pits.

An optical axis of the display modulation light beam is arranged in almost parallel with that of the information modulation light beam and the display modulation light beam is irradiated to the photoresist layer of the disk 23 through the beam splitter 17b, beam expander 18, mirror 19, and objective lens 20, thereby recording the display pits. In order to form the pits for display between the recording tracks, the information modulation light beam and display modulation light beam are separated from each other by almost ½ recording track pitch in the disk radial direction on the recording surface of the disk 23.

The carriage motor 22 moves the optical head 21 in the directions of the arrows (optical disk radial direction) so as to form the recording tracks at a correct pitch in accordance with the rotation of the disk 23.

According to the optical disk manufacturing apparatus comprising the above construction, the information pits for the information signal and the display pits for forming the recognizable pattern can be simultaneously recorded at regular intervals.

In the embodiment, although the depths of display pits are set to be constant, they can be also varied.

It is well known that if replicas are obtained by using the disk 23 processed by the foregoing optical disk manufacturing apparatus, a number of optical disks can be easily derived.

In the optical disk of the present invention, since a recognizable pattern is formed in the information recording area by the display pits or grooves formed between the recording tracks of the optical disk, a clear and enough large pattern such as a character or the like can be displayed. Since the display pits or grooves are formed between the recording tracks, the recognizable pattern can be formed without decreasing a recording density of a normal information signal.

In the apparatus for manufacturing the optical disk in the present invention, the information and display modulation light beams obtained by modulating the light beam in accordance with the information and display pattern signals, respectively, are slightly separated in the disk radial direction and the separated beams are simultaneously irradiated to the photoresist layer of the optical disk master disk as a recording surface. The display pits for forming a recognizable pattern, therefore, can be formed between the recording tracks within a short time.

What is claimed is:

1. An optical disk having an information recording area in which concentrical or spiral recording tracks constructed by pit trains carrying information signals are formed, wherein display pits or grooves are formed between and without contacting said recording tracks so as to display a recognizable pattern in said information recording area.

2. An optical disk according to claim 1, wherein said pattern is formed by a distributing shape of said display pits or grooves or a distributing shape of portions other than said display pits or grooves.

3. An optical disk according to claim 1, wherein a width and a depth of said display pits or grooves are equal to or less than about ½ of those of the pits carrying said information signal.

4. An optical disk according to claim 1, wherein a frequency band of said display pits or grooves is higher than a tracking frequency band of a tracking servo and is lower than that of said information signal.

5. An optical disk according to claim 1, wherein said display pits or grooves are formed between radially adjacent ones of said recording tracks.

6. An optical disk comprising:
   a plurality of tracks; and
   a plurality of display pits or grooves formed between and without contacting said plurality of tracks so as to display a pattern on said disk.

7. An optical disk according to claim 6, wherein said pattern is formed by a distributing shape of said display pits or grooves or a distributing shape of portions other than said display pits or grooves.

8. An optical disk according to claim 6, wherein a width and a depth of said display pits or grooves are equal to or less than about ½ of those of pits carrying an information signal.

9. An optical disk according to claim 6, wherein a frequency band of said display pits or grooves is higher than a tracking frequency band of a tracking servo and is lower than that of an information signal.

10. An optical disk according to claim 6, wherein said display pits or grooves are formed between radially adjacent ones of said tracks.

* * * * *